(12) United States Patent
Kalki et al.

(10) Patent No.: US 9,824,133 B1
(45) Date of Patent: Nov. 21, 2017

(54) CLOUD ANALYTICS MARKETPLACE

(71) Applicant: Amazon Technologies, Inc., Seattle, WA (US)

(72) Inventors: Santosh Kalki, Seattle, WA (US); Srinivasan Sundar Raghavan, Mercer Island, WA (US); Timothy Andrew Rath, Des Moines, WA (US); Mukul Vijay Karnik, Redmond, WA (US); Amol Devgan, Seattle, WA (US); Swaminathan Sivasubramanian, Sammamish, WA (US)

(73) Assignee: Amazon Technologies, Inc., Seattle, WA (US)

(*) Notice: Subject to any disclaimer, the term of this patent is extended or adjusted under 35 U.S.C. 154(b) by 672 days.

(21) Appl. No.: 14/494,473

(22) Filed: Sep. 23, 2014

Related U.S. Application Data

(60) Provisional application No. 62/015,307, filed on Jun. 20, 2014.

(51) Int. Cl.
| | | |
|---|---|---|
| G06F 7/00 | (2006.01) | |
| G06F 17/00 | (2006.01) | |
| G06F 17/30 | (2006.01) | |
| G06F 13/14 | (2006.01) | |

(52) U.S. Cl.
CPC .............. G06F 17/30592 (2013.01)

(58) Field of Classification Search
CPC ......... G06F 17/30592; G06F 17/30914; G06F 17/30539; G06F 17/30554; G06F 17/2247; G06F 17/30292; G06F 17/30569; G06F 17/30286; G06F 17/30557; G06F 17/30595
USPC ......... 707/E17.014, 602, E17.044, 705, 756, 707/803, 999.1, 999.102, E17.001, 636, 707/687, E17.056, 793, 802
See application file for complete search history.

(56) References Cited

U.S. PATENT DOCUMENTS

| | | | | |
|---|---|---|---|---|
| 7,272,613 | B2 * | 9/2007 | Sim ................... | G06F 17/30067 707/999.01 |
| 8,346,711 | B2 * | 1/2013 | Al-Duwaish ........ | G06N 3/0481 700/28 |
| 9,229,997 | B1 * | 1/2016 | Raghavan ............... | H04L 63/10 |
| 2004/0215626 | A1 * | 10/2004 | Colossi ............. | G06F 17/30312 |
| 2010/0057700 | A1 * | 3/2010 | Williamson ...... | G06F 17/30592 707/E17.002 |
| 2013/0254838 | A1 * | 9/2013 | Ahuja ............... | G06F 17/30592 726/1 |
| 2015/0310082 | A1 * | 10/2015 | Han .................. | G06F 17/30592 707/602 |

* cited by examiner

*Primary Examiner* — Heather Herndon
*Assistant Examiner* — Cecile Vo
(74) *Attorney, Agent, or Firm* — Baker & Hostetler LLP

(57) ABSTRACT

A multi-tenant system for providing hosted analytic services may be dynamically configured in response to a request from a user. A request for analytic services may comprise an indication of at least one data source to be incorporated into an n-dimensional cube. A data source connector and transformation pipeline may transform data received from the data source to a format compatible with a dimension and hierarchy model of the n-dimensional cube.

20 Claims, 8 Drawing Sheets

CLOUD ANALYTICS MARKETPLACE

CROSS-REFERENCES TO RELATED APPLICATIONS

This application claims benefit under 35 U.S.C. §119(e) of U.S. Provisional Patent Application No. 62/015,307, filed Jun. 20, 2014, the contents of which are incorporated herein by reference in its entirety.

This application is also related to application entitled "EMBEDDABLE CLOUD ANALYTICS," U.S. Provisional Patent Application No. 62/015,302, filed on Jun. 20, 2014 corresponding to U.S. application Ser. No. 14/494,413, filed on Sep. 23, 2014, now U.S. Pat. No. 9,229,997, as well as application entitled "AUTOMATED HIERARCHY DETECTION FOR CLOUD-BASED ANALYTICS," U.S. Provisional Patent Application No. 62/015,308, filed on Jun. 20, 2014 corresponding to U.S. application Ser. No. 14/503,235, filed on Sep. 23, 2014, as well as application entitled "REAL-TIME HOSTED SYSTEM ANALYTICS," U.S. Provisional Patent Application No. 62/015,294, filed on Jun. 20, 2014 corresponding to U.S. application Ser. No. 14/503,102, filed on Sep. 30, 2014, and U.S. application Ser. No. 14/503,077, filed on Sep. 30, 2014, and application entitled "DYNAMIC CUBES FOR CLOUD-BASED ANALYTICS," U.S. Provisional Patent Application No. 62/015,312, filed on Jun. 20, 2014 corresponding to U.S. application Ser. No. 14/494,506, filed on Sep. 23, 2014, U.S. application Ser. No. 14/494,513, filed on Sep. 23, 2014, and U.S. application Ser. No. 14/494,524, filed on Sep. 23, 2014, which are hereby incorporated by reference in their entireties.

BACKGROUND

Online analytical processing ("OLAP") and other types of data warehouse systems may be used to perform various functions related to data mining, reporting, and forecasting. These types of systems may permit multidimensional analysis of data typically obtained from transaction-oriented systems and loaded into a multidimensional cube structure, on which data analytics may be performed. Although various commercial products may be used in the design and deployment of data warehouse systems, most such systems contain various proprietary components and are not suited for use by parties other than the owner of the data.

BRIEF DESCRIPTION OF DRAWINGS

The following detailed description may be better understood when read in conjunction with the appended drawings. For the purposes of illustration, various examples of aspects of the disclosure are shown in the drawings; however, the invention is not limited to the specific methods and instrumentalities disclosed.

DETAILED DESCRIPTION

Aspects of the present disclosure may be employed in providing data warehousing and OLAP capabilities through a marketplace. Components of a cloud-based data analytics system may be provided as independent components or as part of a system or subsystem for perform data analytics. In an embodiment, a marketplace may receive a request to provide data analytics using data from one or more data sources. Embodiments may identify a dimension and hierarchy model appropriate for performing analytics on the data, and construct an n-dimensional cube that reflects the dimension and hierarchy model. Connector components may be selected and configured to retrieve data from the selected data sources. Embodiments may enable a transformation pipeline for adapting information from the data sources to a format suitable for incorporation into the data cube.

Figure 1:
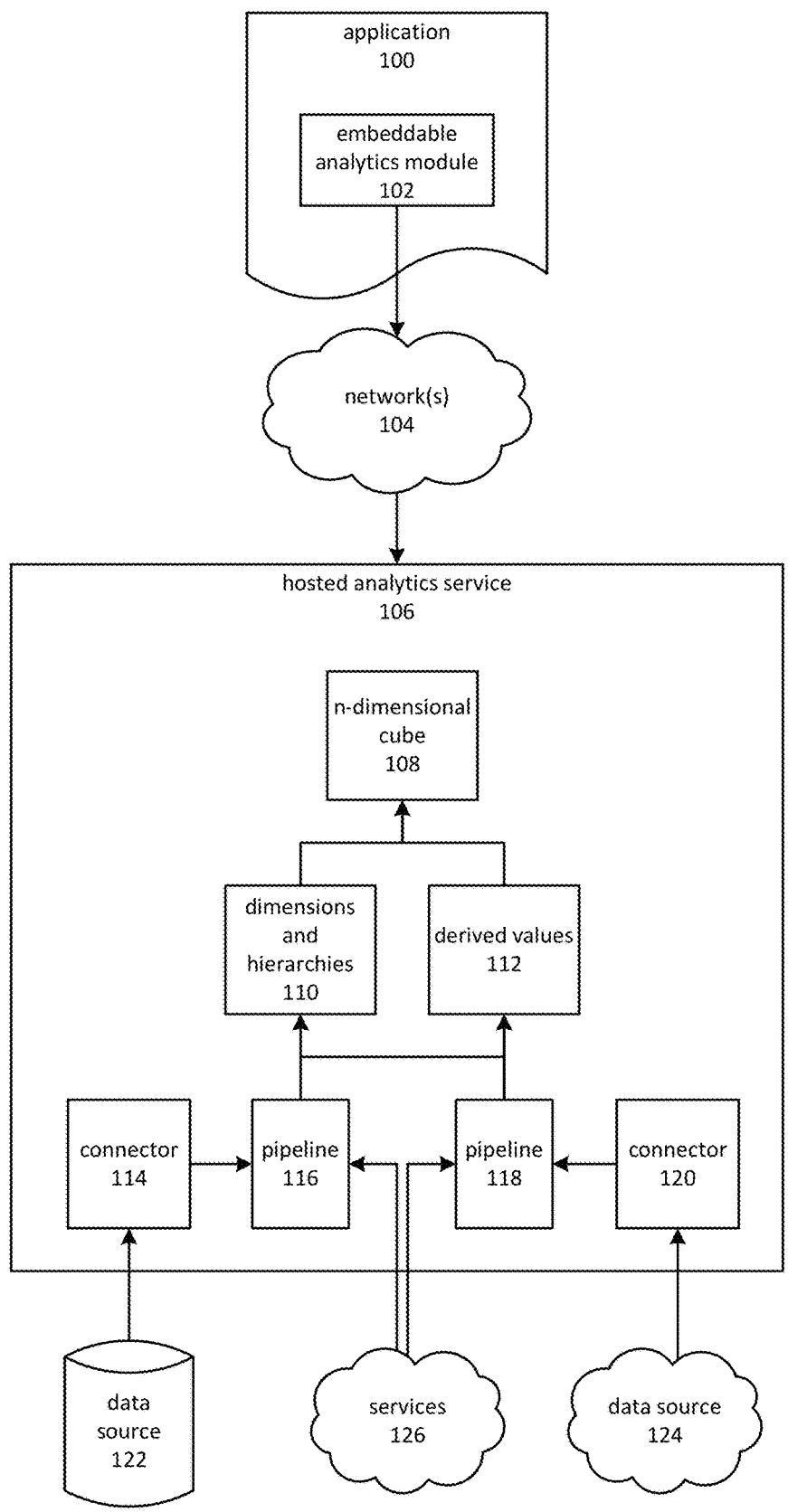
FIG. 1 is a block diagram depicting an example of a cloud-based analytics system adapted for distribution through an analytics marketplace.

FIG. 1 is a block diagram depicting an example of a cloud-based analytics system adapted for distribution through an analytics marketplace. In various embodiments, components of an analytics system may be distributed through a marketplace as a wholly or partially integrated system, as individual components, or as groups of components. Here, the term components may refer to a variety of system elements, including but not limited to software components, hardware components, and the provision of services. FIG. 1 depicts various components that may comprise a cloud-based analytic system, as adapted for distribution through a marketplace.

An application 100 may comprise executable instructions for interacting with a hosted analytics service 106. Application 100 may provide for the interaction by including an embeddable analytics module 102, which may interact with hosted analytics service 106 through network(s) 104. Note that although FIG. 1 depicts embeddable analytics module 102 as being embedded in application 100, various cases and embodiments may involve distribution of embeddable analytics module 102 separately from an application, such as application 100.

Embeddable analytics module 102 may also include standalone controls, visualizations, interactive exhibits, and so forth. In some cases and embodiments, embeddable analytics module 102 may be provided by a publisher as an analytics package operative against a curated data set. A curated data set might, for example, be maintained by the publisher or might be publicly maintained. Various forms of pre-packaged analysis, such as data mining operations or other insight-generating mechanisms, may be provided to clients of an analytics marketplace.

A hosted analytics service 106 may be operated by a provider of hosted services on behalf of one or more clients. A client of hosted analytics service 106 may be a customer of the provider, not only for analytical services but also for the provision of other services, such as those related to the maintenance of transactional data.

An n-dimensional cube 108 may be allocated to a user, developer, or publisher of application 100 or embeddable analytics module 102. In various embodiments, an n-dimensional cube 108 may be maintained on a multi-tenant system, in which multiple n-dimensional cubes may be maintained on one computing node. In some cases, n-dimensional cubes may be shared between customers, such as users, developers, or application publishers. In some embodiments, n-dimensional cubes may be partitioned and maintained on multiple computing nodes. Embodiments may also perform replication of an n-dimensional cube or n-dimensional cube partition.

Associated with n-dimensional cube 108 are dimensions and hierarchies 110 and derived values 112. These components may collectively be used to maintain analytical information in n-dimensional cube 108 and to perform analytical operations using the maintained information. Dimensions and hierarchies 110 may include definitions of dimensions to be maintained in n-dimensional cube 108 and software and/or hardware modules for doing so. Derived values 112 may include hardware and/or software-based mechanisms for calculating new values based on data incoming from pipeline 116 or pipeline 118.

An n-dimensional cube 108 may be formed to comprise dimensions and hierarchies 110 and derived values 112. Forming an n-dimensional cube 108 may comprise operations such as allocating storage space, initializing data structures to store aggregate values, storing aggregate values in the initialized data structures, initializing data structures related to access control, and so on. Embodiments may form n-dimensional cube 108 to incorporate or to be compatible with various aspects of performing data analytics operations that were selected or otherwise identified by a customer of a data analytics marketplace. For example, an n-dimensional cube 108 may be formed to support a dimension and hierarchy module used in a visualization selected by a marketplace customer.

Pipelines 116 or 118 may comprise mechanisms for performing transformational operations, which may be referred to as transforms, on incoming data. Examples of transformation operations include, but are not limited to, data cleansing operations, data normalization, and so forth. Data may be fed through a pipeline, such as pipeline 116 or pipeline 118, and processed through various operations, such as those involving dimensions and hierarchies 110 and derived values 112.

A pipeline may be associated with a connector and a data source. For example, pipeline 116 may be linked to data source 122 by connector 114, and pipeline 118 may be linked to data source 124 by connector 120. A connector may include software and/or hardware for establishing communications with a data source and preparing or adapting data from the data source for input into a pipeline. A connector may perform different functions depending on various factors, such as the nature of the data source to which it connects. For example, data source 122 might represent a relational database containing transactional data. Connector 114 might include a mechanism for establishing a network connection to data source 122, issuing structured query language ("SQL") commands for retrieving data, normalizing the column names and content of the retrieved data, and so on. Data source 124 might represent a different type of data source, such as an Internet-based web site. Connector 120 might retrieve web pages from data source 124, perform screen-scraping, and normalize data for entry into pipeline 118.

Embodiments may also utilize various services 126 in conjunction with hosted analytics service 106. FIG. 1 depicts one example of utilizing services. Operations performed by pipeline 116 and pipeline 118 may utilize one or more services 126. For example, embodiments may maintain a database of common data misrepresentations that may be used in a data cleansing and correction operation performed by pipelines 116 and 118. Vendors may also provide similar services, possibly customized to reflect specialized areas of knowledge.

Another example of a service involves sets of data cleansing rules. These may be provided by a publisher as an integrated component of a pipeline, or as one of services 126.

Figure 2:
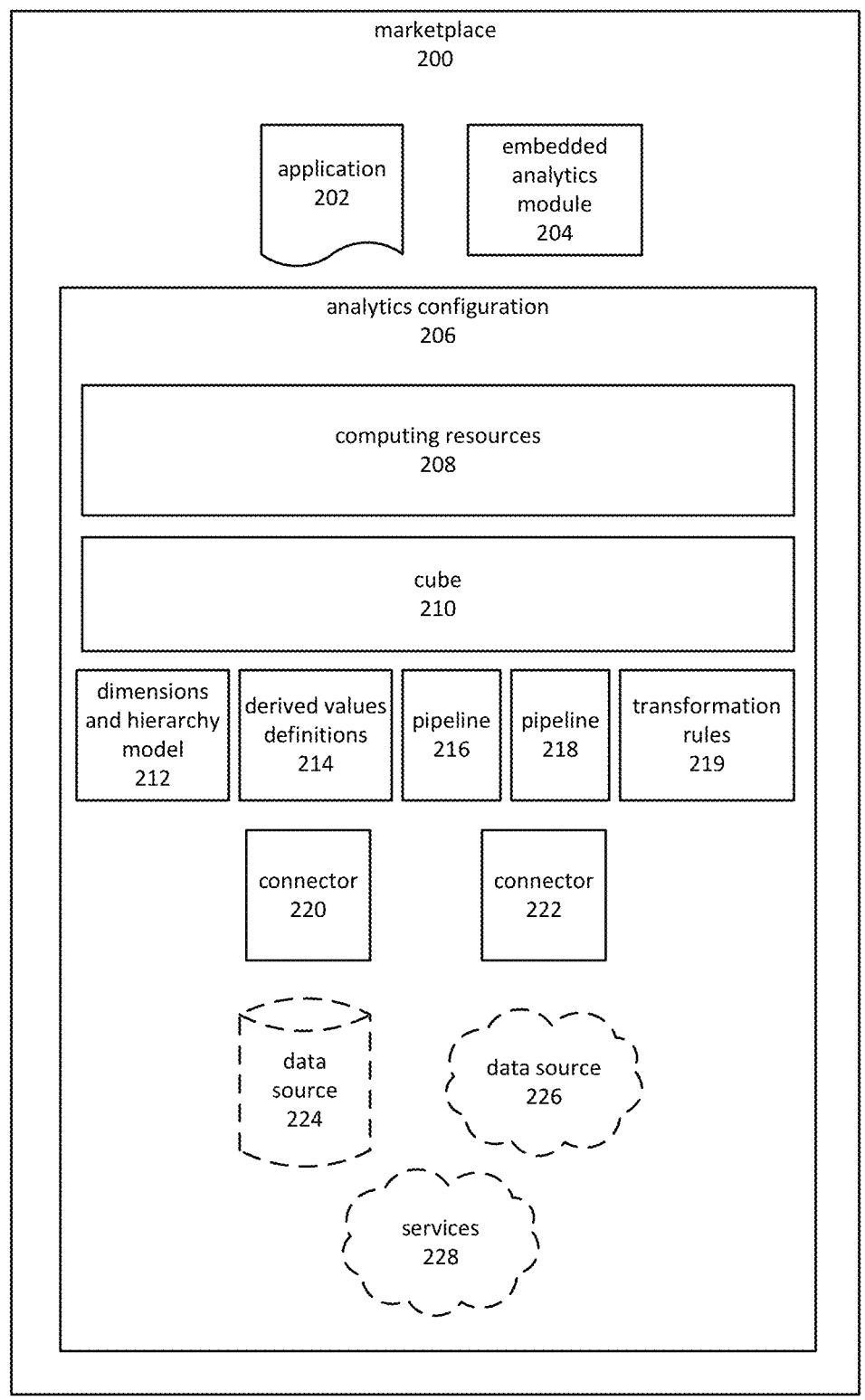
FIG. 2 is a block diagram depicting elements of a cloud-based analytics system that may be distributed through a marketplace.

Various components of the cloud-based analytics system depicted in FIG. 1 may be distributed through a marketplace. FIG. 2 is a block diagram depicting elements of a cloud-based analytics system that may be distributed through a marketplace. A marketplace 200 may comprise an automated system for the publishing, promotion, evaluation, and distribution of components of a cloud-based analytics platform. This may include not only distribution of executable code, but also provisioning of hosting services, licensing agreements, configuration data, and so forth. Customers of a marketplace 200 may select various features, such as those depicted in FIG. 2, for inclusion in an analytics service hosted on their behalf. Features may be selected individually, in combination, or based on interrelationships between features. For example, a customer of marketplace 200 may select a visualization feature. The visualization may in turn rely on an n-dimensional cube that conforms to a certain dimension and hierarchy model and contains data from a number of data sources. In various cases and embodiments, the associated features, such as the dimension and hierarchy model, may be automatically selected based on the selection of the visualization.

Application 202 may be distributed through marketplace 200. In some cases application 202 may be distributed as a standalone component, which is to say without the provisioning of any additional components of an analytics platform. However, distribution of application 202 may include distribution of an integrated package of components, possibly including hosting services, licensing agreements, configuration data, and so forth as necessary to provide a complete analytics platform.

Embedded analytics module 204 may be distributed as a standalone package or as part of a nearly complete package in a manner similar to the distribution of a complete analytics platform that includes application 202. In other words, embedded analytics module 204 may be provided to a customer of the marketplace 200 in conjunction with elements needed to form a complete analytics platform, save for an application in which embedded analytics module 204 may be embedded.

Various elements of an analytics platform may be bundled as a set and distributed through marketplace 200. The set of components may be described as analytics configuration 206. An application 202 may be distributed with an analytics configuration 206 to form a complete analytics platform. A similar approach may be taken regarding embedded analytics module 204. Note that in the context of analytics configuration 206, the term distribution may include operations—such as reserving computing resources in a hosted computing environment, obtaining licensing agreements with data providers, distributing software components, configuring interaction between various hosted services, and so on.

Computing resources 208 may be allocated to a customer (not shown) of marketplace 200 individually or as an element of analytics configuration 206. Computing resources 208 may be reserved on behalf of a customer of marketplace 200. The resources may comprise virtual machine instances, storage space, and so on. In some embodiments, a provisioning or usage metering plan may be established with the customer of marketplace 200.

An n-dimensional cube 210 may comprise a representation of a multidimensional cube maintained on one or more computing nodes maintained by a provider of hosted analytics services. The structure of the n-dimensional cube may be adapted to data, dimensions, hierarchies, and derived values specified by a customer of marketplace 200. An n-dimensional cube 210 may be related to dimensions and hierarchy model 212 and a set of derived values definitions 214. In various cases and embodiments, an n-dimensional cube may be distributed, or bundled, independently of analytics configuration 206, with a dimensions and hierarchy model 212 and derived values definitions 214.

A dimensions and hierarchy model 212 may comprise definitions of dimensions and hierarchies of data to be included in an n-dimensional cube. The model may also include information indicative of how data may be integrated into an n-dimensional cube using the specified set of dimensions and hierarchies. For example, a dimension and hierarchy model 212 might contain metadata specifying the configuration of one or more pipelines (such as pipelines 216 and 218) that might be used in conjunction with dimension and hierarchy model 212. In some embodiments, metadata may be used to describe the requirements of the dimension and hierarchy model.

A set of derived values definitions may comprise formulas, code, or other forms of instructions that may be performed to calculate derived values. A set of derived values definitions 214 may contain metadata similar to metadata that may be contained in a dimensions and hierarchy model 212. The metadata may also contain references or descriptions of a compatible dimension and hierarchy model, such as dimensions and hierarchy model 212.

A dimensions and hierarchy model 212 and/or a set of derived values definitions 214 may be distributed in a marketplace in conjunction with or independently of an analytics configuration 206. Third-party dimensions and hierarchy models distributed through a marketplace may be selected for use in analytics configuration 206.

A data transformation pipeline may also be distributed independently or as part of a group of elements, which may include other elements of analytics configuration 206. In some cases and embodiments, a pipeline may be distributed with sufficient elements so as to enable extraction of data from a given source, in a form compatible with a desired set of dimensions, hierarchies, and derived value definitions. For example, a pipeline 216 might be selected for distribution to a customer of marketplace 200 based on the compatibility of its output with dimensions and hierarchy model 212.

A data source may be joined to a pipeline via a connector. For example, data source 224 may be joined to pipeline 216 via connector 220, and data source 226 may be joined to pipeline 218 via connector 222. Connectors may be distributed as part of a set of elements, such as a set including access to data source 224, connector 220, and pipeline 216. Connectors may also be distributed independently. Note that FIG. 2 does not explicitly depicts connections between elements such as pipeline 216 and connector 220, or between pipeline 216 and n-dimensional cube 210, to illustrate that connections may be dynamically established on a per-customer, per-publisher, or per-application basis (for example). Sale of an analytics application, widget or other element in a data analytics marketplace may, in various embodiments, comprise establishing a set of connections as needed to configure a platform for performing analytics, as needed for the particular customer, developer, publisher, application, or a combination thereof.

Various transformation rules 219 may be obtained and deployed in a data analytics system. Transformation rules 219 may comprise computer-readable definitions or computer-readable instructions for performing various transformative operations on data. The transformative operations may be applicable to various stages or inputs of the system. For example, a transformation rule might define a stage of pipeline 218. Transformation rules 219 might also be defined in relation to derived values definitions 214 as instructions for calculating a derived value.

Transformation rules 219 may be published by a user of marketplace 200 for use by other users. This might occur when a customer of marketplace 200 develops analytical techniques that may be useful to other customers of marketplace 200. Embodiments may receive data corresponding to transformation rules 219 from a first customer of marketplace 200 and display information describing the transformation rules to other customers. These customers may select transformation rules 219 from a set of transformation rules displayed for evaluation. Upon receiving an indication that a customer has selected a set of transformation rules 219, embodiments may incorporate the rules into processing of data for inclusion in n-dimensional cube 210. In some cases, various components may be published and/or purchased as a group, such as a group including transformation rules 219, dimensions and hierarchy model 212, derived values definitions 214, and so on.

Connectors may be promoted in a marketplace based on factors, such as compatibility with various dimension and hierarchy models, compatibility with various data sources, performance, and so on. Connectors distributed through a marketplace may be referred to as third-part connectors. Performance of a connector may be evaluated by a provider of hosted services based on the performance of the connector in previous use instances. For example, a customer of marketplace 200 might be advised of the reliability of connector 220 based on the experience of previous customers of marketplace 200. However, unlike conventional rating systems, the rating of connector 200 may be based on objective information collected by a provider of a hosted analytics service that may also be the provider of the marketplace. For example, while providing analytic services to a first customer, a provider may monitor the performance and reliability of connector 220, and base a recommendation to a second customer on the monitored performance. Similar rating techniques may be applied to other individual elements of an analytics configuration, and may also be based on performance factors obtained by monitoring operation of the respective element or combination of elements.

Access to data sources, such as data sources 224 and 226, may also be distributed through marketplace 200. In some cases, distribution of a data source may involve distribution of credentials, a licensing key, or similar information. Distribution may also involve the configuration of hosted elements of analytics configuration 206 to enable access to the data source. For example, pipeline 218 might be configured with credentials necessary to obtain access to data source 226.

In some cases, a data source may comprise a complete data set. Distribution of the data set may then comprise providing credentials to access the data set, providing a copy of the data, importing the data into another system, and so on. This may be performed in conjunction with distribution of a connector and or a pipeline. Various publishers may provide access to curated data sets coupled with access to corresponding connectors, pipelines, dimension and hierarchy models, and/or derived values.

Embodiments may also provide access to various services 228, which may be used in various analytical stages. Examples include services related to data cleansing, data dictionaries, knowledge sets, and so forth.

Embodiments may provide information enabling a user of a marketplace to evaluate and select a data source. Evaluation and selection may be based on information related to the availability and performance of a connector that is compatible with the resource. Embodiments may transmit information useful for evaluating data sources and receive information indicative of a data source being selected in a marketplace application. Embodiments may transmit information to a marketplace application that is usable for evaluating a data source, a data connector, and dimension and hierarchy models. This information may be displayed in a marketplace application. The information may further provide recommended combinations of components.

Figure 3:
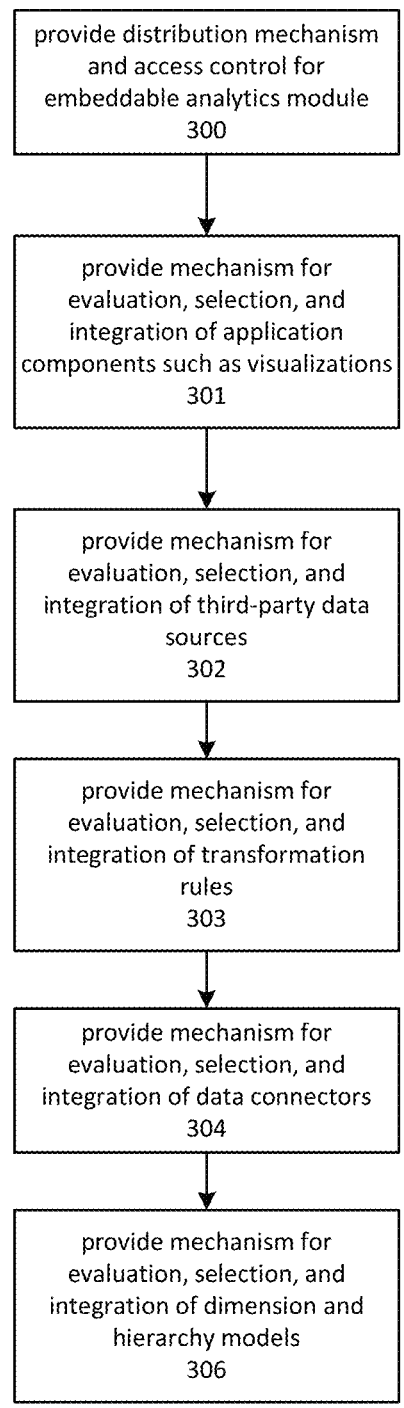
FIG. 3 is a flowchart depicting an embodiment of a process for providing a marketplace for hosted analytics platforms.

FIG. 3 is a flowchart depicting an embodiment of a process for providing a marketplace for hosted analytics platforms. Although depicted as a sequence of operations, those of ordinary skill in the art will appreciate that the depicted order should not be construed as limiting the scope of the present disclosure and that at least some of the depicted operations may be altered, omitted, reordered, supplemented with additional operations, or performed in parallel. Embodiments of the depicted process may be implemented using various combinations of computer-executable instructions executed by a computing system, such as the computing systems described herein.

Operation 300 depicts providing a distribution mechanism and an access control mechanism for an embeddable analytics module. Embodiments may rely on a token-based mechanism in which the content of a token is used to grant or deny access to a hosted analytics service. A token may be included in an embedded analytics module and included in requests for analytics conveyed to a hosted analytics service.

Operation 301 depicts providing a mechanism for the evaluation, selection, and integration of various application components. Non-limiting examples of application components include visualization components and analytics dashboards. A visualization component may be an embeddable analytics module or a subcomponent thereof. A visualization component may comprise instructions for graphically depicting analytical information from an n-dimensional cube. A few non-limiting examples include charts, graphs, reports, and so on. Visualization components may also be referred to as visualizations. A dashboard component may comprise various visualization components, and in some cases may be arranged to display relationships between various aspects of data displayed in the dashboard.

Application behaviors may also be evaluated, selected, and integrated through an analytics marketplace. Application behaviors may include various behaviors that may be performed by an embeddable analytics module. Examples of behaviors include whether or not data can be edited, whether or not visualizations or dashboards may be modified, actions that may be performed or triggered as a result of decisions made based on displayed analytics, and so on.

In various embodiments, a mechanism for providing for the evaluation, selection, and integration of dashboards, visualizations, and application behaviors as depicted by operation 301 may include a mechanism for publishing or otherwise reusing visualizations, dashboards, and application behaviors. Embodiments may display information to a marketplace customer to assist in the evaluation of a visualization, dashboard, or application behavior. This might comprise screenshots or other information.

A mechanism for selecting these and other aspects depicted in FIG. 3 may involve displaying reusable components, such as visualizations, in a marketplace where they may be selected for reuse. Integrating these and other aspects depicted in FIG. 3 may include automatically deploying and configuring a component to function within a hosted analytics service. For example, a visualization might be published in a marketplace by a first customer and then selected for use in a hosted analytics platform by a second customer. Embodiments may, in response to the selection, cause the visualization to be integrated into the second customer's embeddable analytics modules. The embodiment might then perform further configurations, such as connecting data sources, establishing pipelines, modifying dimension and hierarchy models, and so on, as needed to enable functionality of the selected visualization component.

Operation 302 depicts providing a mechanism for the evaluation, selection, and integration of third-party data sources. Various data sources may be promoted to a customer of a marketplace. A recommendation engine may promote a data source based on possible correlation between data maintained or produced by the data source and other data in a system that a customer of hosted analytics has or is in the process of acquiring. A user may select a data source based on these and other factors. The data source may then be integrated in various ways, for example, by configuring a connector and pipeline and adding data from the new source to any relevant dimension and hierarchy models, to any correlated n-dimensional cubes, and so on.

Operation 303 depicts providing a mechanism for the evaluation, selection, and integration of transformation rules. Transformation rules may be published for evaluation by a customer in a marketplace, selected by a customer, and then integrated into a hosted analytics service. Information displayed in a marketplace or otherwise transmitted may comprise information describing the type of transformation, its processing efficiencies, its compatibility with various data sources, and so on. A transformation rule may be selected by a customer for integration into the customer's hosted analytics environment. Integration may comprise configuring various components to perform or apply the transformation rules and to use data transformed by the rules in performing analytics.

Operation 304 depicts providing a mechanism for evaluation, selection, and integration of data connectors. Data sources may be promoted and evaluated by marketplace customers based on various metrics, including compatibility with data sources and performance metrics collected by a provider of a hosted analytics service. Once selected by a customer, embodiments may configure the connector within the hosted analytics environment as indicated. Alternatively, a connector module may be transmitted to the customer for operation in a non-hosted environment, in which case output of the connector may be transmitted directly or indirectly to a pipeline or other entry point for processing and storage in an n-dimensional cube.

Operation 306 depicts providing a mechanism for evaluation, selection, and integration of dimension and hierarchy models. Dimension and hierarchy models, as well as derived calculations, may be promoted based on factors, such as similarity to or compatibility with types, categories, dimensions, and hierarchies already being used by a marketplace customer. Embodiments may also promote dimension and hierarchy models and derived calculations based on usage statistics, insights obtained, or other usage factors. Integration of a selected dimension and hierarchy model, or derived calculations, may comprise configuring n-dimensional cubes and pipelines to conform to a selected dimension and hierarchy model and/or a set of derived calculations.

Embodiments may also provide mechanisms for evaluating, selecting, and/or integrating various additional components or aspects of a hosted data analytics system. For example, an aggregation engine specialized for some particular field of use might be selected from a marketplace and integrated into a hosted analytics system. Configuring a specialized aggregation engine might comprise configuring components of a hosted analytics system, such as a pipeline, to feed data to the specialized aggregation engine so that the engine can compute aggregate data values and populate an n-dimensional cube.

Figure 4:
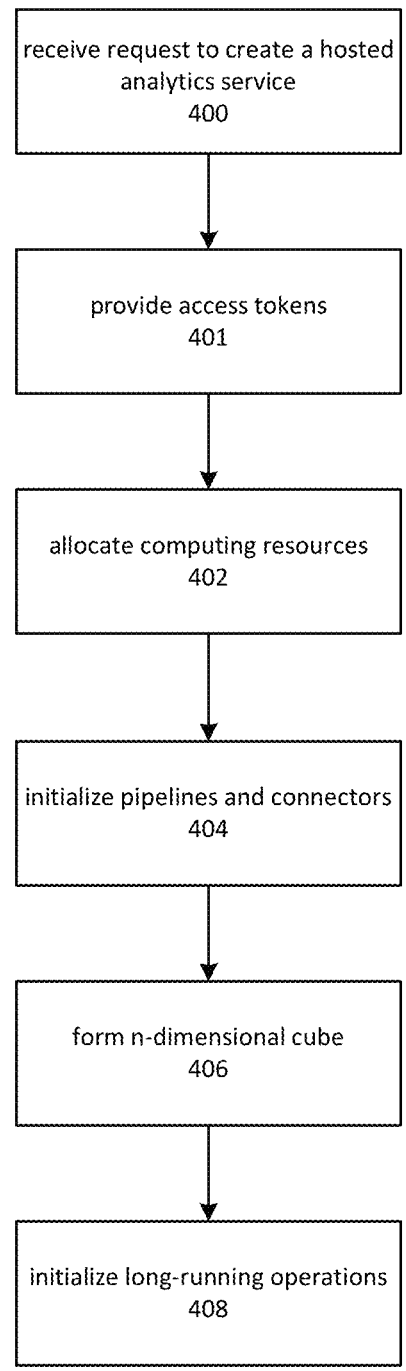
FIG. 4 depicts an embodiment of a process for configuring elements of a hosted analytics system.

FIG. 4 depicts an embodiment of a process for configuring elements of a hosted analytics system. Although depicted as a sequence of operations, those of ordinary skill in the art will appreciate that the depicted order should not be construed as limiting the scope of the present disclosure and that at least some of the depicted operations may be altered, omitted, reordered, supplemented with additional operations, or performed in parallel. Embodiments of the depicted process may be implemented using various combinations of computer-executable instructions executed by a computing system, such as the computing systems described herein.

Operation 400 depicts an embodiment receiving a request to create a hosted analytics service. A request to create a hosted analytics service may comprise information indicative of various features to be included in the requested service. The request may, for example, specify visualization to be enabled, data sources to be used to obtain data for analysis, dimension and hierarchy models to be used, and so on. The features indicated by the request may correspond to selections made by a marketplace customer, or those identified through other means, such as determining that a second feature is required to enable a first feature.

Operation 401 depicts providing access tokens. An access token may be provided to a user, developer, or publisher of an application program. A copy of the access token may be included in a request to perform analytics functions. Embodiments may utilize the content of the token to perform operations, such as correlating the request with an appropriate n-dimensional cube and validating the user's authority to invoke the request. Tokens may contain data that identifies an n-dimensional cube associated with the application invoking a request or that application's user, developer, or publisher.

Operation 402 depicts allocating computing resources for providing hosted analytics services. A provider of a hosted analytics service may, in response to receiving a request from a marketplace, allocate various types of computing resources usable to process incoming data, maintain an n-dimensional cube, store n-dimensional cube information, process queries, and so forth. Embodiments may reserve storage space for n-dimensional cubes to be populated, allocate a virtual machine or reserve capacity on an existing system, and so forth.

Operation 404 depicts initializing pipelines and connectors. For data sources selected by a customer of the marketplace, a connector may be configured to connect to the selected data source and to process data for entry into a transformation pipeline. A pipeline may be configured to process data input from the connector, perform operations—such as data cleansing and normalization—and feed the data, directly or indirectly, into an n-dimensional cube.

Operation 406 depicts forming an n-dimensional cube structure and populating it with an initially available set of data. In some cases, analytics may be performed on existing sets of data, which may allow an n-dimensional cube to be pre-populated. In other cases, there may be no historical data, and the n-dimensional cube may be populated in real-time as data arrives.

Embodiments may form an n-dimensional cube that represents a dimension and hierarchy model received from a marketplace. In some cases and embodiments, a dimension and hierarchy model may be selected by a marketplace customer. A component of the marketplace may transmit information indicative of the selection to a hosted analytics service, which may then incorporate the selected dimension and hierarchy model into an n-dimensional cube. Embodiments may also form an n-dimensional cube from a dimension and hierarchy model received from a module or component that makes a selection or calculation of a dimension and hierarchy model. In some cases, a dimension and hierarchy model may be determined by compositing various dimensions and hierarchies received from a variety of sources.

Operation 408 depicts initializing long-running operations. One example involves long-running processes that may maintain connector and pipeline activities to cause real-time or log data to be continuously added to an n-dimensional cube. A second example involves long-running queries, insight generation, and so forth. A third example involves processes that perform maintenance operations, such as maintaining the n-dimensional cube.

Figure 5A:
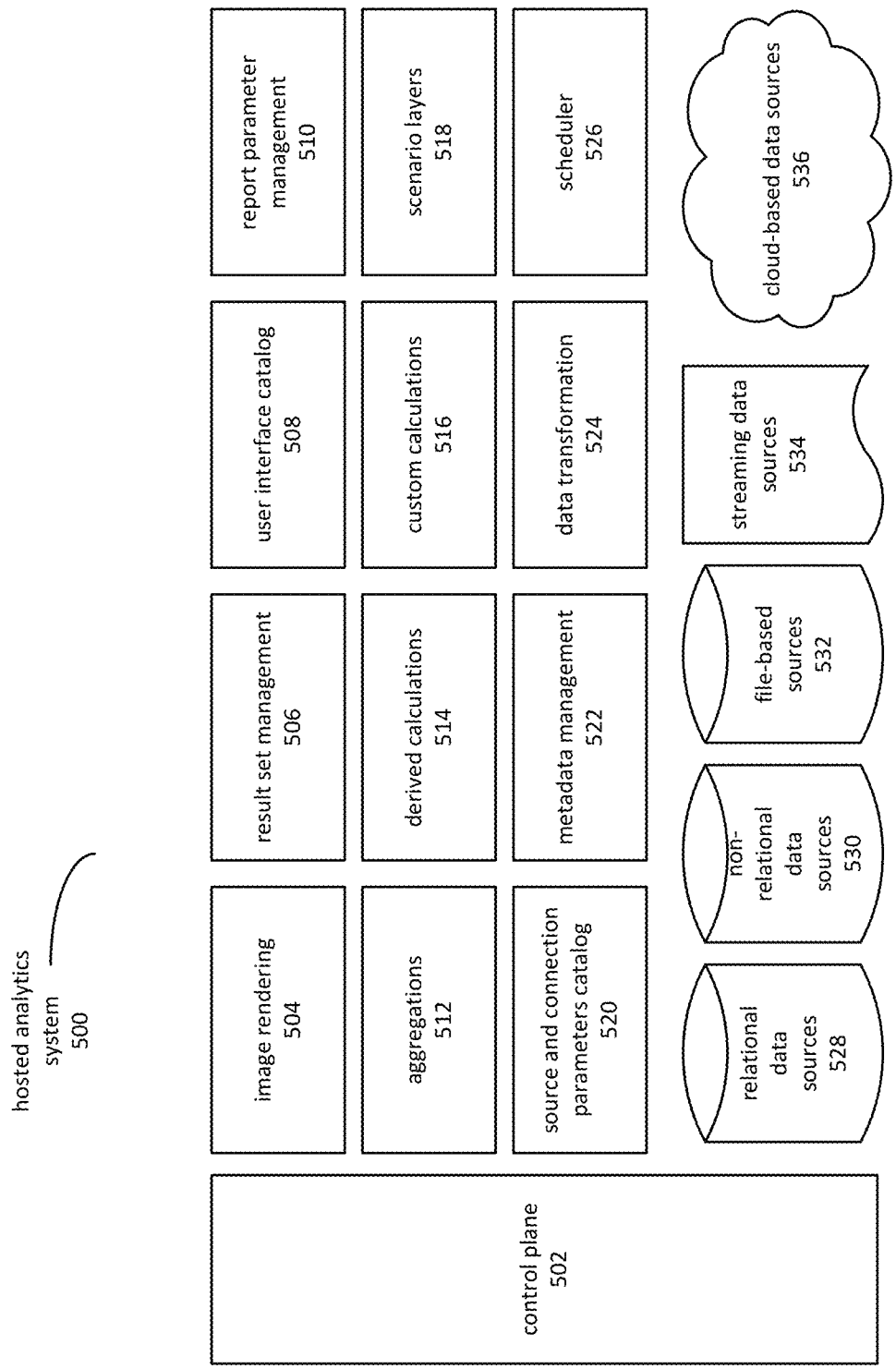
FIG. 5A is a block diagram depicting an embodiment of a system for providing hosted analytics services.

FIG. 5A is a block diagram depicting an embodiment of a system for providing hosted analytics services. A hosted analytics system 500 may be managed by a control plane 502 that coordinates activities of various modules of the system.

An image rendering 504 module may provide rendering services for embedded user-interface components, such as graphs and charts. A result set management 506 module may maintain history information, data caches, and so forth pertaining to results of performing analysis. A user interface catalog 508 module may maintain a repository of user interface elements for embedded analytics, such as images and so forth, that might be inserted in the user interface of an application that includes embedded analytics features. A report parameter management 510 module may comprise a repository of parameters to be used in generating analytical reports or other visualizations, such as time periods, geographic region, dimensions to include in a report, desired drill-down levels, and so on.

An aggregations 512 module may perform operations to calculate aggregate values in various dimensions and combinations of dimensions. For example, aggregations 512 module may calculate monthly, weekly, and daily sales data for a particular store, geographic region, and state.

A derived calculations 514 module may perform second-order calculations based on aggregate data and other information. A custom calculations 516 module may perform report-specific or user-provided calculations. Custom calculations may be provided, for example, by an application publisher.

A scenario layers 518 module may perform operations related to simulations, projections, or other types of "what-if" scenarios. These may be custom scenarios provided, for example, by an application publisher.

A source and connection parameters catalog 520 may maintain information used to locate and connect to various information sources. Information for locating sources may include network address, uniform resource locators ("URLs"), and so forth. Information for connecting may include various forms of credentials, accounts, user names, and so forth.

A metadata management 522 module may maintain various forms of metadata and other information used in interfacing with various data sources, such as relational data sources 528, non-relational data sources 530, file-based sources 532, streaming sources 534, and cloud-based sources 536. Embodiments may employ metadata from metadata management 522 module in conjunction with data transformation 524 module. Data transformation 524 module may perform data transformation and data cleansing operations on incoming data.

A scheduler 526 module may coordinate timing of various activities performed by hosted analytics system 500. The coordination may involve scheduling n-dimensional cube rebuilding, scheduling data retrieval and so forth.

Various data sources may be employed. These include relation data sources 528, such as SQL-based relational database management systems, as well as non-relational data sources 530. Various non-relational data sources 530 may include NoSQL database systems, key-value pair databases, object-relational databases, and so forth. Various file-based sources 532 may be used, such as document repositories, log files, and so forth. Log files may also be treated as streaming data sources 534, which may also include other types of data sources where data may be updated on an ongoing basis. Another example that may be categorized with other streaming data sources 534 is data generated from videogames, such as multi-player video games.

Various types of cloud-based data sources 536 may be used. These may include various web sites or data sources maintained by a provider of hosted analytics services, an application publisher, a user of an application, or a third party.

Figure 5B:
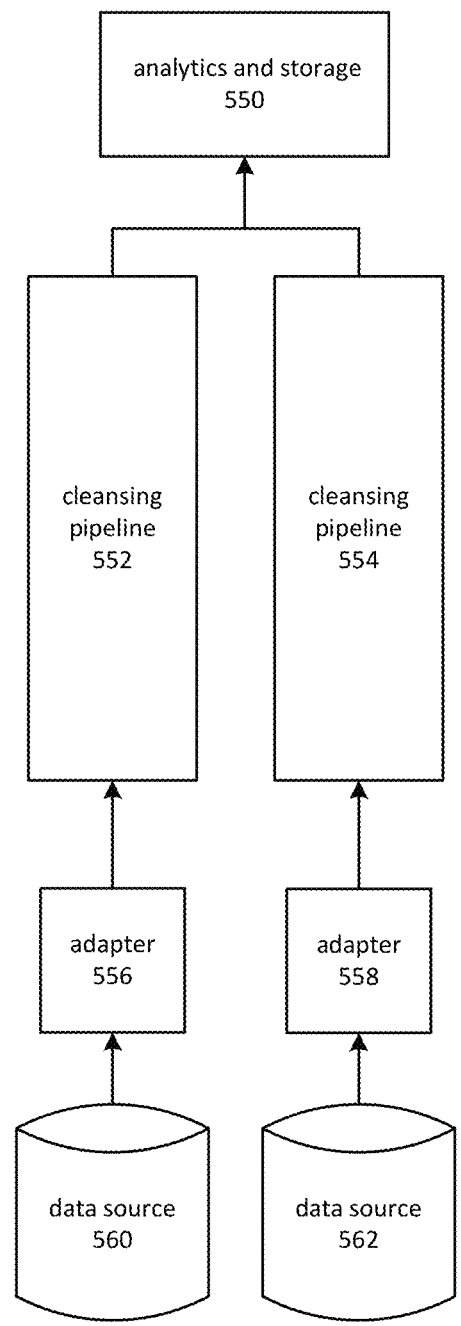
FIG. 5B depicts a process for intake and processing of data from real-time data sources.

FIG. 5B depicts a process for the intake and processing of data from real-time data sources. A data source 560 may be communicatively coupled to an adapter 556 and a cleansing pipeline 552. Additional data sources, such as data source 562, may be communicatively coupled to other adapters and pipelines, such as adapter 558 and cleansing pipeline 554.

An adapter 556 may transform data from data source 560 to a format suitable for processing by cleansing pipeline 552. Operations performed by cleansing pipeline 552 may include performing one or more translations or transformations on incoming data. Examples include stemming, lemmatisation, and so forth. A cleansing pipeline 552 may be multiplexing. This may include performing cleansing along multiple paths in order to produce data in a normalized format that matches a normalized format used in each destination n-dimensional cube.

FIG. 5B depicts an analytics and storage 550 module. This may refer to various components for performing analytics, such as modules 502-526 in FIG. 5A. Cleansed data incoming from cleansing pipelines 552 and 554 might be processed by an analytics and storage 550 module. The processing might include operations, such as performing aggregation, performing custom calculations, scenario modeling, and so forth. Data from cleansing pipelines 552 and 554, as well as any calculated or derived values, may be routed and stored in an appropriate n-dimensional cube.

In various cases and embodiments, cloud-based analytics features developed by a first entity may be embedded in an application program developed by a second entity. Scenarios such as this may be described as "third-party" analytics, indicating that the source or sources of the data, the provider of the analytics functionality, the publisher of an application incorporating the analytics functionality, and the user of the application are not necessarily the same party.

Embodiments of the present disclosure may employ a token-based mechanism for providing secure access to analytics information. A token or other form of unique identifier may be associated with an n-dimensional cube, and further associated with access rights to data points within the n-dimensional cube. The unique identifier may be distributed with applications that perform analytical operations using the n-dimensional cube. The application may be configured to transmit requests to perform analytical operations, the requests containing the unique identifier. Embodiments may use the unique identifier in the processing of the request to identify an n-dimensional cube to which the requesting application has rights, and to determine which data points the requesting application has rights to access. In some embodiments, access rights may be indicative of a level in an aggregation hierarchy that the requested application is permitted to access.

Consistent with aspects of the present disclosure, a system may comprise one or more computing nodes. One or more memories may have stored thereon computer-readable instructions that, upon execution, cause the system at least to receive a request to configure a hosted service to provide analytical operations involving a data source indicated by the request; select a dimension and hierarchy model representative of data to be obtained from the data source, the dimension and hierarchy model comprising information indicative of a plurality of dimensions for identifying data points of an n-dimensional cube and information indicative of aggregated data to be stored in the data points of the n-dimensional cube, the dimension and hierarchy model selected based at least in part on the data source; form the n-dimensional cube based at least in part on the dimension and hierarchy model; configure the one or more computing nodes to receive data from the data source; configure the one or more computing nodes to apply a transformation to data received from the data source to a format suitable for incorporation into aggregated data to be stored in data points of the n-dimensional cube; receive a first data from the data source, apply the transformation to the first data, and incorporate the transformed first data into the n-dimensional cube; and perform an analytical operation based at least in part on the transformed first data incorporated into the n-dimensional cube.

An n-dimensional cube may be referred to as a cube, an OLAP cube, an n-dimensional array, and so forth. An n-dimensional cube may also be referred to as a multidimensional database or a multidimensional data structure used for performing analytics. An n-dimensional cube may comprise data structures stored on one or more memory and/or storage devices. The data structures may be representative of dimensions and of aggregates, derived values, and other various attributes that may be associated with intersections of the dimensions represented by the n-dimensional cube. Hierarchies may be represented in an n-dimensional cube and used to determine various levels of aggregation for data points stored in the n-dimensional cube. The structure and content of an n-dimensional cube may be utilized to perform various analytical and reporting operations, including but not limited to those that might be characterized as OLAP operations. Note that the name used to describe an n-dimensional cube structure should not be construed as imposing any limitation on the number of dimensions represented by the structure. For example, the terms "n-dimensional cube" and "cube" may be used interchangeably to refer to cubes containing more than or fewer than three dimensions.

In another embodiment, a computer-implemented method for providing hosted analytical service may comprise: receiving a request to configure a hosted service to provide analytical operations on data obtained from a data source indicated by the request; forming, in at least one of a memory or storage device communicatively coupled to one or more computing nodes, an n-dimensional cube based at least in part on a dimension and hierarchy model comprising information indicative of a plurality of dimensions for identifying data points of the n-dimensional cube and information indicative of aggregated data to be stored at the data points, the dimension and hierarchy model selected based at least in part on the data source; configuring the one or more computing nodes to receive data from the data source; and configuring the one or more computing nodes to transform data received from the data source to a format suitable for incorporation into the n-dimensional cube.

In an embodiment, a computer-readable storage medium or computer program product may have stored thereon instructions that, upon execution by a computing device, cause the computing device at least to: receive a request to configure a hosted service to provide analytical operations on data obtained from a data source indicated by the request; form, in at least one of a memory or storage device communicatively coupled to one or more computing nodes, an n-dimensional cube based at least in part on a dimension and hierarchy model comprising information indicative of a plurality of dimensions for identifying data points of the n-dimensional cube and information indicative of aggregated data to be stored at the data points, the dimension and hierarchy model selected based at least in part on the data source; configure the one or more computing nodes to receive data from the data source; and configure the one or more computing nodes to transform data received from the data source to a format suitable for incorporation into aggregated data values to be stored in data points of the n-dimensional cube.

Embodiments may also comprise, in various combinations with other aspects disclosed herein, selecting the dimension and hierarchy model based at least in part on metadata associated with the data source.

Embodiments may also comprise, in various combinations with other aspects disclosed herein, associating the n-dimensional cube with a unique identifier; associating the unique identifier with access rights to data points in the n-dimensional cube; and distributing the unique identifier with an application sold in a marketplace, wherein the application is configured to transmit requests for data analysis operations, the requests comprising the unique identifier.

Embodiments may also comprise, in various combinations with other aspects disclosed herein, transmitting information indicative of the data source for display in a marketplace application; transmitting information indicative of a connector compatible with the data source; and receiving information indicative of a selection of the data source and the connector compatible with the data source.

Embodiments may also comprise, in various combinations with other aspects disclosed herein, providing information for display to a user of an analytics marketplace, the provided information indicative of a criteria for evaluating at least one of the data source, the dimension and hierarchy model, and a connector for transforming data received from the data source to the format suitable for incorporation into the n-dimensional cube.

Embodiments may also comprise, in various combinations with other aspects disclosed herein, providing information for display to a user of an analytics marketplace, the provided information indicative of a report or other visualization, the report associated with a dimension and a hierarchy; and selecting the dimension and hierarchy model based at least in part on the dimension and the hierarchy associated with the report.

Embodiments may also comprise, in various combinations with other aspects disclosed herein, receiving a second request to configure a second hosted service to provide analytical operations associated with a second n-dimensional cube; and reserving resources of the one or more computing nodes for use in processing the analytical operations associated with the second n-dimensional cube.

Embodiments of the present disclosure may be employed in conjunction with many types of database management systems ("DBMSs"). A DBMS is a software and hardware system for maintaining an organized collection of data on which storage and retrieval operations may be performed. In a DBMS, data is typically organized by associations between key values and additional data. The nature of the associations may be based on real-world relationships that exist in the collection of data, or it may be arbitrary. Various operations may be performed by a DBMS, including data definition, queries, updates, and administration. Some DBMSs provide for interaction with the database using query languages, such as structured query language ("SQL"), while others use APIs containing operations, such as put and get and so forth. Interaction with the database may also be based on various protocols or standards, such as hypertext markup language ("HTML") and extended markup language ("XML"). A DBMS may comprise various architectural components, such as a storage engine that acts to store data on one or more storage devices, such as solid-state drives.

Figure 6:
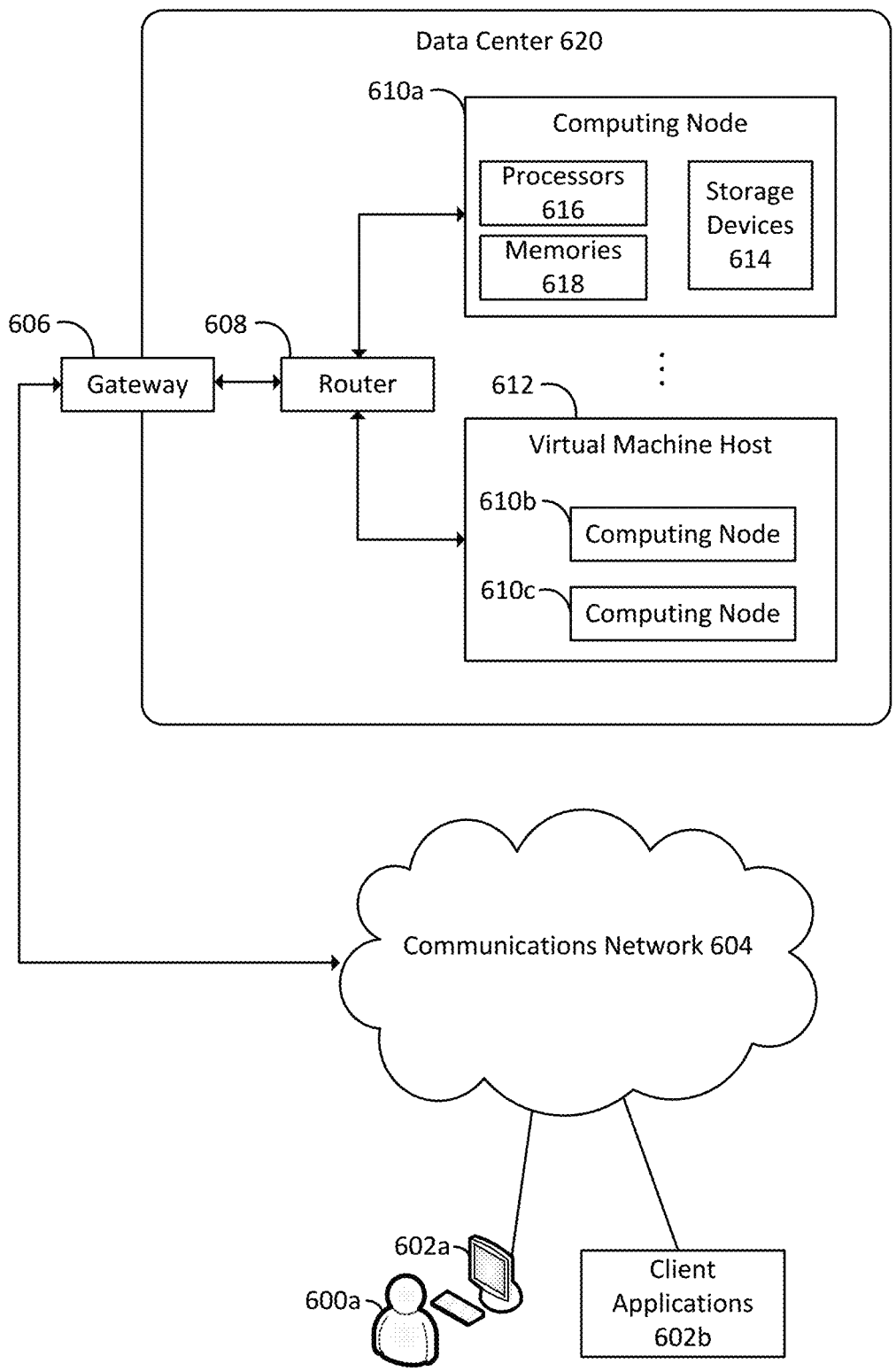
FIG. 6 is a block diagram depicting an embodiment of a computing environment in which aspects of the present disclosure may be practiced.

FIG. 6 is a diagram depicting an example of a distributed computing environment on which aspects of the present invention may be practiced. Various users 600a may interact with various client applications, operating on any type of computing device 602a, to communicate over communications network 604 with processes executing on various computing nodes 610a, 610b, and 610c within a data center 620. Alternatively, client applications 602b may communicate without user intervention. Communications network 604 may comprise any combination of communications technology, including the Internet, wired and wireless local area networks, fiber optic networks, satellite communications, and so forth. Any number of networking protocols may be employed.

Communication with processes executing on the computing nodes 610a, 610b, and 610c, operating within data center 620, may be provided via gateway 606 and router 608. Numerous other network configurations may also be employed. Although not explicitly depicted in FIG. 6, various authentication mechanisms, web service layers, business objects, or other intermediate layers may be provided to mediate communication with the processes executing on computing nodes 610a, 610b, and 610c. Some of these intermediate layers may themselves comprise processes executing on one or more of the computing nodes. Computing nodes 610a, 610b, and 610c, and processes executing thereon, may also communicate with each other via router 608. Alternatively, separate communication paths may be employed. In some embodiments, data center 620 may be configured to communicate with additional data centers, such that the computing nodes and processes executing thereon may communicate with computing nodes and processes operating within other data centers.

Computing node 610*a* is depicted as residing on physical hardware comprising one or more processors 616, one or more memories 618, and one or more storage devices 614. Processes on computing node 610*a* may execute in conjunction with an operating system or alternatively may execute as a bare-metal process that directly interacts with physical resources, such as processors 616, memories 618, or storage devices 614.

Computing nodes 610*b* and 610*c* are depicted as operating on virtual machine host 612, which may provide shared access to various physical resources, such as physical processors, memory, and storage devices. Any number of virtualization mechanisms might be employed to host the computing nodes.

The various computing nodes depicted in FIG. 6 may be configured to host web services, database management systems, business objects, monitoring and diagnostic facilities, and so forth. A computing node may refer to various types of computing resources, such as personal computers, servers, clustered computing devices, and so forth. A computing node may, for example, refer to various computing devices, such as cell phones, smartphones, tablets, embedded device, and so on. When implemented in hardware form, computing nodes are generally associated with one or more memories configured to store computer-readable instructions and one or more processors configured to read and execute the instructions. A hardware-based computing node may also comprise one or more storage devices, network interfaces, communications buses, user interface devices, and so forth. Computing nodes also encompass virtualized computing resources, such as virtual machines implemented with or without a hypervisor, virtualized bare-metal environments, and so forth. A virtualization-based computing node may have virtualized access to hardware resources as well as non-virtualized access. The computing node may be configured to execute an operating system as well as one or more application programs. In some embodiments, a computing node might also comprise bare-metal application programs.

Figure 7:
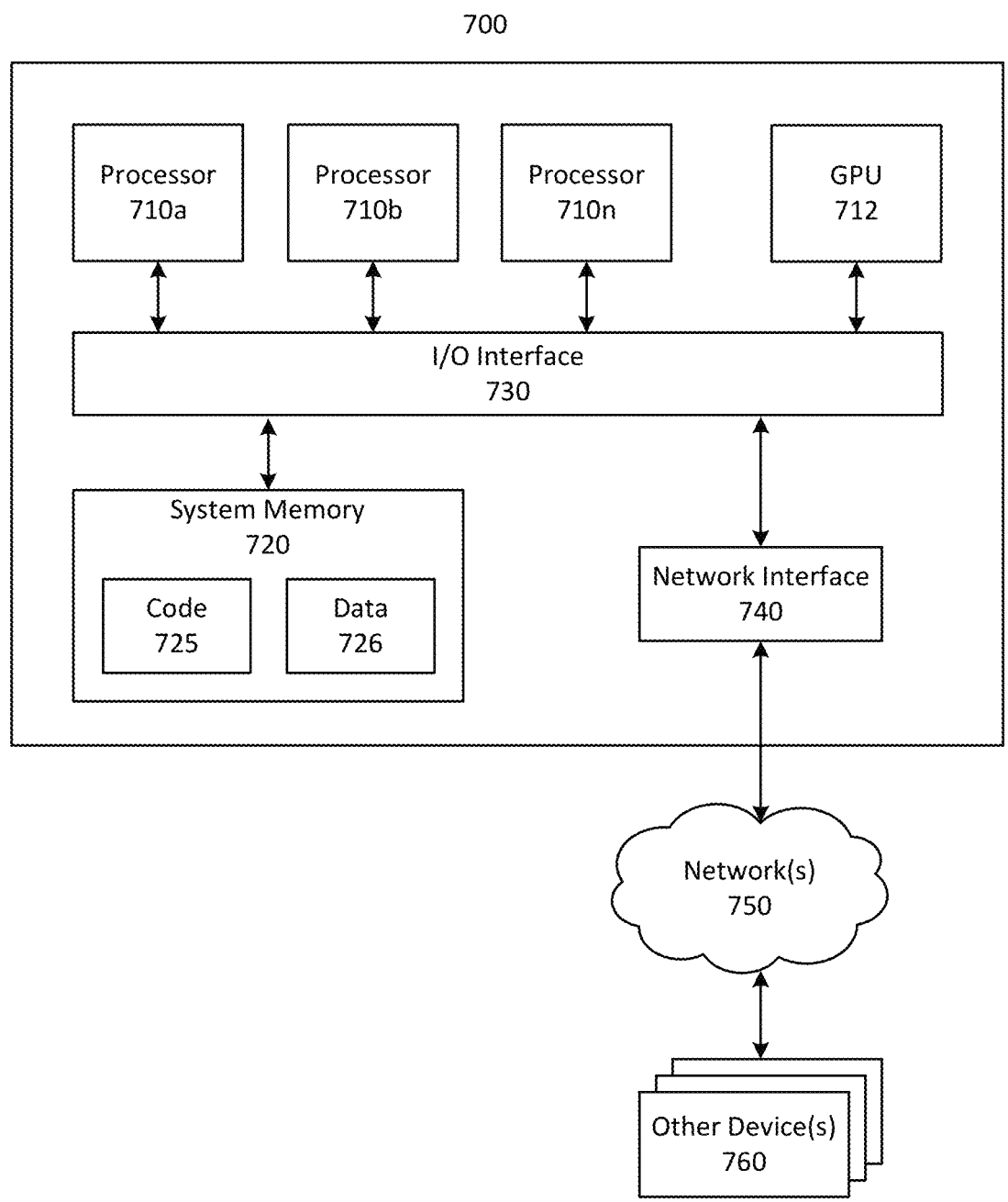
FIG. 7 is a block diagram depicting an embodiment of a computing system on which aspects of the present disclosure may be practiced.

In at least some embodiments, a server that implements a portion or all of one or more of the technologies described herein may include a general-purpose computer system that includes or is configured to access one or more computer-accessible media. FIG. 7 depicts a general-purpose computer system that includes or is configured to access one or more computer-accessible media. In the illustrated embodiment, computing device 700 includes one or more processors 710*a*, 710*b*, and/or 710*n* (which may be referred herein singularly as a processor 710 or in the plural as the processors 710) coupled to a system memory 720 via an input/output (I/O) interface 730. Computing device 700 further includes a network interface 740 coupled to I/O interface 730.

In various embodiments, computing device 700 may be a uniprocessor system including one processor 710 or a multiprocessor system including several processors 710 (e.g., two, four, eight, or another suitable number). Processors 710 may be any suitable processors capable of executing instructions. For example, in various embodiments, processors 610 may be general-purpose or embedded processors implementing any of a variety of instruction set architectures (ISAs), such as the x86, PowerPC, SPARC, or MIPS ISAs or any other suitable ISA. In multiprocessor systems, each of processors 710 may commonly, but not necessarily, implement the same ISA.

In some embodiments, a graphics processing unit ("GPU") 712 may participate in providing graphics rendering and/or physics processing capabilities. A GPU may, for example, comprise a highly parallelized processor architecture specialized for graphical computations. In some embodiments, processors 710 and GPU 712 may be implemented as one or more of the same type of device.

System memory 720 may be configured to store instructions and data accessible by processor(s) 710. In various embodiments, system memory 720 may be implemented using any suitable memory technology, such as static random access memory ("SRAM"), synchronous dynamic RAM ("SDRAM"), nonvolatile/Flash®-type memory, or any other type of memory. In the illustrated embodiment, program instructions, and data implementing one or more desired functions, such as those methods, techniques and data described above, are shown stored within system memory 720 as code 725 and data 726.

In one embodiment, I/O interface 730 may be configured to coordinate I/O traffic between processor 710, system memory 720, and any peripherals in the device, including network interface 740 or other peripheral interfaces. In some embodiments, I/O interface 730 may perform any necessary protocol, timing or other data transformations to convert data signals from one component (e.g., system memory 720) into a format suitable for use by another component (e.g., processor 710). In some embodiments, I/O interface 730 may include support for devices attached through various types of peripheral buses, such as a variant of the Peripheral Component Interconnect (PCI) bus standard or the Universal Serial Bus (USB) standard, for example. In some embodiments, the function of I/O interface 730 may be split into two or more separate components, such as a north bridge and a south bridge, for example. Also, in some embodiments some or all of the functionality of I/O interface 730, such as an interface to system memory 620, may be incorporated directly into processor 710.

Network interface 740 may be configured to allow data to be exchanged between computing device 700 and other device or devices 760 attached to a network or networks 750, such as other computer systems or devices, for example. In various embodiments, network interface 740 may support communication via any suitable wired or wireless general data networks, such as types of Ethernet networks, for example. Additionally, network interface 740 may support communication via telecommunications/telephony networks, such as analog voice networks or digital fiber communications networks, via storage area networks, such as Fibre Channel SANs (storage area networks), or via any other suitable type of network and/or protocol.

In some embodiments, system memory 720 may be one embodiment of a computer-accessible medium configured to store program instructions and data as described above for implementing embodiments of the corresponding methods and apparatus. However, in other embodiments, program instructions and/or data may be received, sent, or stored upon different types of computer-accessible media. Generally speaking, a computer-accessible medium may include non-transitory storage media or memory media, such as magnetic or optical media, e.g., disk or DVD/CD coupled to computing device 700 via I/O interface 730. A non-transitory computer-accessible storage medium may also include any volatile or non-volatile media, such as RAM (e.g., SDRAM, DDR SDRAM, RDRAM, SRAM, etc.), ROM, etc., that may be included in some embodiments of computing device 700 as system memory 720 or another type of memory. Further, a computer-accessible medium may include transmission media or signals, such as electrical, electromagnetic or digital signals, conveyed via a communication medium, such as a network and/or a wireless link, such as those that may be implemented via network interface 740. Portions or all of multiple computing devices, such as those illustrated in FIG. 7, may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device," as used herein, refers to at least all these types of devices and is not limited to these types of devices.

A compute node, which may be referred to also as a computing node, may be implemented on a wide variety of computing environments, such as tablet computers, personal computers, smartphones, game consoles, commodity-hardware computers, virtual machines, web services, computing clusters, and computing appliances. Any of these computing devices or environments may, for convenience, be described as compute nodes or as computing nodes.

A network set up by an entity, such as a company or a public sector organization, to provide one or more web services (such as various types of cloud-based computing or storage) accessible via the Internet and/or other networks to a distributed set of clients may be termed a provider network. Such a provider network may include numerous data centers hosting various resource pools, such as collections of physical and/or virtualized computer servers, storage devices, networking equipment, and the like, needed to implement and distribute the infrastructure and web services offered by the provider network. The resources may in some embodiments be offered to clients in various units related to the web service, such as an amount of storage capacity for storage, processing capability for processing, as instances, as sets of related services, and the like. A virtual computing instance may, for example, comprise one or more servers with a specified computational capacity (which may be specified by indicating the type and number of CPUs, the main memory size, and so on) and a specified software stack (e.g., a particular version of an operating system, which may in turn run on top of a hypervisor).

A number of different types of computing devices may be used singly or in combination to implement the resources of the provider network in different embodiments, including general-purpose or special-purpose computer servers, storage devices, network devices, and the like. In some embodiments a client or user may be provided direct access to a resource instance, e.g., by giving a user an administrator login and password. In other embodiments, the provider network operator may allow clients to specify execution requirements for specified client applications and schedule execution of the applications on behalf of the client on execution platforms (such as application server instances, Java™ virtual machines (JVMs), general-purpose or special-purpose operating systems, platforms that support various interpreted or compiled programming languages—such as Ruby, Perl, Python, C, C++, and the like—or high-performance computing platforms) suitable for the applications, without, for example, requiring the client to access an instance or an execution platform directly. A given execution platform may utilize one or more resource instances in some implementations; in other implementations multiple execution platforms may be mapped to a single resource instance.

In many environments, operators of provider networks that implement different types of virtualized computing, storage, and/or other network-accessible functionality may allow customers to reserve or purchase access to resources in various resource acquisition modes. The computing resource provider may provide facilities for customers to select and launch the desired computing resources, deploy application components to the computing resources, and maintain an application executing in the environment. In addition, the computing resource provider may provide further facilities for the customer to quickly and easily scale up or scale down the numbers and types of resources allocated to the application, either manually or through automatic scaling, as demand for or capacity requirements of the application change. The computing resources provided by the computing resource provider may be made available in discrete units, which may be referred to as instances. An instance may represent a physical server hardware platform, a virtual machine instance executing on a server, or some combination of the two. Various types and configurations of instances may be made available, including different sizes of resources executing different operating systems (OS) and/or hypervisors, and with various installed software applications, runtimes, and the like. Instances may further be available in specific availability zones, representing a logical region, a fault tolerant region, a data center, or other geographic location of the underlying computing hardware, for example. Instances may be copied within an availability zone or across availability zones to improve the redundancy of the instance, and instances may be migrated within a particular availability zone or across availability zones. As one example, the latency for client communications with a particular server in an availability zone may be less than the latency for client communications with a different server. As such, an instance may be migrated from the higher latency server to the lower latency server to improve the overall client experience.

In some embodiments the provider network may be organized into a plurality of geographical regions, and each region may include one or more availability zones. An availability zone (which may also be referred to as an availability container) in turn may comprise one or more distinct locations or data centers, configured in such a way that the resources in a given availability zone may be isolated or insulated from failures in other availability zones. That is, a failure in one availability zone may not be expected to result in a failure in any other availability zone. Thus, the availability profile of a resource instance is intended to be independent of the availability profile of a resource instance in a different availability zone. Clients may be able to protect their applications from failures at a single location by launching multiple application instances in respective availability zones. At the same time, in some implementations inexpensive and low latency network connectivity may be provided between resource instances that reside within the same geographical region (and network transmissions between resources of the same availability zone may be even faster).

Each of the processes, methods, and algorithms described in the preceding sections may be embodied in, and fully or partially automated by, code modules executed by one or more computers or computer processors. The code modules may be stored on any type of non-transitory computer-readable medium or computer storage device, such as hard drives, solid state memory, optical disc, and/or the like. The processes and algorithms may be implemented partially or wholly in application-specific circuitry. The results of the disclosed processes and process steps may be stored, persistently or otherwise, in any type of non-transitory computer storage such as, e.g., volatile or non-volatile storage.

The various features and processes described above may be used independently of one another, or may be combined in various ways. All possible combinations and sub-combinations are intended to fall within the scope of this disclosure. In addition, certain methods or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

It will also be appreciated that various items are illustrated as being stored in memory or on storage while being used, and that these items or portions thereof may be transferred between memory and other storage devices for purposes of memory management and data integrity. Alternatively, in other embodiments some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or all of the modules, systems and data structures may also be stored (e.g., as software instructions or structured data) on a computer-readable medium, such as a hard disk, a memory, a network, or a portable media article to be read by an appropriate device or via an appropriate connection. The systems, modules, and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without author input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

While certain example embodiments have been described, these embodiments have been presented by way of example only, and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions, and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

What is claimed:

1. A system comprising:
    one or more computing nodes;
    one or more memories having stored thereon computer-readable instructions that, upon execution, cause the system at least to:
        receive a request to create a hosted service to provide analytical operations on a data source indicated by the request;
        associate one or more computing nodes with the service by reserving resources of the one or more computing nodes for providing the analytical operations;
        receive a dimension and hierarchy model representative of data to be obtained from the data source, the dimension and hierarchy model comprising information indicative of a plurality of dimensions for identifying data points of an n-dimensional cube and information indicative of aggregated data to be stored in the data points of the n-dimensional cube, the dimension and hierarchy model selected based at least in part on the request;
        form the n-dimensional cube based at least in part on the dimension and hierarchy model;
        configure the one or more computing nodes to receive data from the data source;
        configure the one or more computing nodes to apply a transformation to data received from the data source to a format suitable for incorporation into aggregated data to be stored in data points of the n-dimensional cube;
        receive a first data from the data source, apply the transformation to the first data, and incorporate the transformed first data into the n-dimensional cube; and
        perform an analytical operation based at least in part on the transformed first data incorporated into the n-dimensional cube.

2. The system of claim 1, wherein the data source indicated by the request corresponds to a selection of a data source made subsequent to displaying, in a marketplace application, information indicative of a plurality of data sources including the data source.

3. The system of claim 1, further comprising one or more memories having stored thereon computer-readable instructions that, upon execution by the one or more computing nodes, cause the system at least to:
configure the one or more computing nodes to receive data from the data source by at least establishing a connection between at least one of the one or more computing nodes and a database maintained by an operator of the one or more computing nodes.

4. The system of claim 1, further comprising one or more memories having stored thereon computer-readable instructions that, upon execution by the one or more computing nodes, cause the system at least to:
provide information for display to a customer of an analytics marketplace, the provided information indicative of information for evaluating at least one of a third-party data source, a third-party data connector, and a third-party dimension and hierarchy model.

5. A computer-implemented method comprising:
receiving a request to create a hosted service to provide analytical operations on data obtained from a data source indicated by the request, wherein the request is based at least in part on a feature of the analytical operations identified in a marketplace for analytical operations;
associating one or more computing nodes with the service by reserving resources of the one or more computing nodes for providing the analytical operations;
forming, on the one or more computing nodes associated with the hosted service, an n-dimensional cube based at least in part on a dimension and hierarchy model comprising information indicative of a plurality of dimensions for identifying data points of the n-dimensional cube and information indicative of aggregated data to be stored at the data points, the dimension and hierarchy model identified based at least in part on the request;
configuring the one or more computing nodes to receive data from the data source; and
configuring the one or more computing nodes to transform data received from the data source to a format suitable for incorporation into the n-dimensional cube.

6. The method of claim 5, further comprising:
selecting the dimension and hierarchy model from a plurality of dimension and hierarchy models maintained in a marketplace, the selecting based at least in part on comparing dimensional values associated with the data source with the selected dimension and hierarchy model.

7. The method of claim 5, further comprising:
associating the n-dimensional cube with a unique identifier;
associating the unique identifier with access rights to data points in the n-dimensional cube; and
distributing the unique identifier with an application sold in a marketplace, wherein the application is configured to transmit requests for data analysis operations, the requests comprising the unique identifier.

8. The method of claim 5, further comprising:
transmitting information indicative of the data source for display in a marketplace application;
transmitting information indicative of a connector compatible with the data source; and
receiving information indicative of a selection of the data source and the connector compatible with the data source.

9. The method of claim 5, further comprising:
providing information for display to a user of an analytics marketplace, the provided information suitable for evaluating at least one of the data source, the dimension and hierarchy model, and a connector for transforming data received from the data source to the format suitable for incorporation into the n-dimensional cube.

10. The method of claim 5, wherein the dimension and hierarchy model was published to a marketplace by a third party.

11. The method of claim 5, further comprising:
receiving information indicative of a visualization selected in an analytics marketplace, the visualization associated with a dimension and a hierarchy; and
selecting the dimension and hierarchy model based at least in part on the dimension and the hierarchy associated with the visualization.

12. The method of claim 5, wherein creating the service comprising creating a token indicative of access to the n-dimensional cube and restricting requests to access data in the n-dimensional cube based at least in part on the token.

13. The method of claim 5, wherein incorporating data into the n-dimensional cube comprises calculating aggregates involving the transformed data.

14. A non-transitory computer-readable storage medium having stored thereon instructions that, upon execution by a computing device, cause the computing device at least to:
receive a request to configure a hosted service to provide analytical operations on data obtained from a data source indicated by the request, wherein the request is based at least in part on a feature of the analytical operations identified in a marketplace for analytical operations;
associating one or more computing nodes with the service by reserving resources of the one or more computing nodes for providing the analytical operations;
form, on the one or more computing nodes associated with the hosted service, an n-dimensional cube based at least in part on a dimension and hierarchy model comprising information indicative of a plurality of dimensions for identifying data points of the n-dimensional cube and information indicative of aggregated data to be stored at the data points, the dimension and hierarchy model identified based at least in part on the request;
configure the one or more computing nodes to receive data from the data source; and
configure the one or more computing nodes to transform data received from the data source to a format suitable for incorporation into aggregated data values to be stored in data points of the n-dimensional cube.

15. The non-transitory computer-readable storage medium of claim 14, comprising further instructions that, upon execution by the one or more computing devices, cause the one or more computing devices to at least:
receive information indicative of a visualization selected in an analytics marketplace, the visualization associated with a dimension and a hierarchy; and
select the dimension and hierarchy model based at least in part on the dimension and the hierarchy associated with the visualization.

16. The non-transitory computer-readable storage medium of claim 14, comprising further instructions that, upon execution by the one or more computing devices, cause the one or more computing devices to at least:
  associate the n-dimensional cube with a unique identifier;
  associate the unique identifier with access rights to data points in the n-dimensional cube; and
  distribute the unique identifier with an application sold in a marketplace, wherein the application is configured to transmit requests for data analysis operations, the requests comprising the unique identifier.

17. The non-transitory computer-readable storage medium of claim 14, comprising further instructions that, upon execution by the one or more computing devices, cause the one or more computing devices to at least:
  transmit information indicative of the data source for display in a marketplace application;
  transmit information indicative of a connector compatible with the data source; and
  receive information indicative of a selection of the data source and the connector compatible with the data source.

18. The non-transitory computer-readable storage medium of claim 14, comprising further instructions that, upon execution by the one or more computing devices, cause the one or more computing devices to at least:
  provide information for display to a user of an analytics marketplace, the provided information indicative of a criteria for evaluating at least one of the data source, the dimension and hierarchy model, and a connector for transforming data received from the data source to the format suitable for incorporation into the n-dimensional cube.

19. The non-transitory computer-readable storage medium of claim 14, wherein the aggregated data values are based on hierarchies of the dimension and hierarchy model.

20. The non-transitory computer-readable storage medium of claim 14, wherein creating the service comprising creating a token indicative of access to the n-dimensional cube and restricting requests to access data in the n-dimensional cube based at least in part on the token.

* * * * *